United States Patent [19]

Ward

[11] 4,332,240
[45] Jun. 1, 1982

[54] SOLAR-ENERGY-POWERED SUN TRACKER

[76] Inventor: Carter J. Ward, 604 Sunfish Way, Port Hueneme, Calif. 93041

[21] Appl. No.: 220,675

[22] Filed: Dec. 29, 1980

Related U.S. Application Data

[62] Division of Ser. No. 69,665, Aug. 24, 1979, Pat. No. 4,262,654.

[51] Int. Cl.³ .............................................. F24J 3/02
[52] U.S. Cl. .................... 126/425; 126/438; 353/3; 350/288
[58] Field of Search ............... 126/424, 425, 438-440, 126/451; 353/3; 250/203 R; 350/283, 292, 288, 293

[56] References Cited

U.S. PATENT DOCUMENTS

| | | | |
|---|---|---|---|
| 4,027,651 | 6/1977 | Robbins, Jr. | 126/425 |
| 4,089,323 | 5/1978 | Trihery | 126/425 |
| 4,175,391 | 11/1979 | Baer | 126/424 |
| 4,185,615 | 1/1980 | Bottum | 126/425 |
| 4,198,954 | 4/1980 | Meijer | 126/425 |
| 4,226,502 | 10/1980 | Gunzler | 126/425 |
| 4,262,654 | 4/1981 | Ward | 126/425 |
| 4,275,712 | 6/1981 | Baer | 126/425 |
| 4,283,588 | 8/1981 | Zitzersberger | 126/424 |

Primary Examiner—James C. Yeung
Attorney, Agent, or Firm—Robert F. Beers; Joseph M. St.Amand

[57] ABSTRACT

Apparatus for following the sun using the sun's radiant energy to heat a fluid-containing sensor to create a pressure which is used to rotate the apparatus against a spring force provided by an expansion bellows. The sunlight is permitted to strike the sensor only for certain angles of incidence to the apparatus so that the fluid pressure and the spring force rotate the apparatus to a predetermined position relative to the angle of incidence. In one embodiment, sunlight passing through a filter including several parallel plates which allow passage of sunlight having a predetermined angle of incidence relative to the filter is focused on the sensor. A reflector focuses sunlight on the sensor to reposition the apparatus to the desired position when the apparatus is incorrectly positioned because the sun has been obscured by clouds. In two alternative embodiments, a fresnel lens and a parabolic reflector, respectively, focus sunlight having a predetermined angle of incidence onto the sensor. In the alternative embodiments, a thermally conducting fin attached to the sensor receives the focused sunlight to reposition the apparatus when the sun reappears after having been obscured by clouds.

8 Claims, 7 Drawing Figures

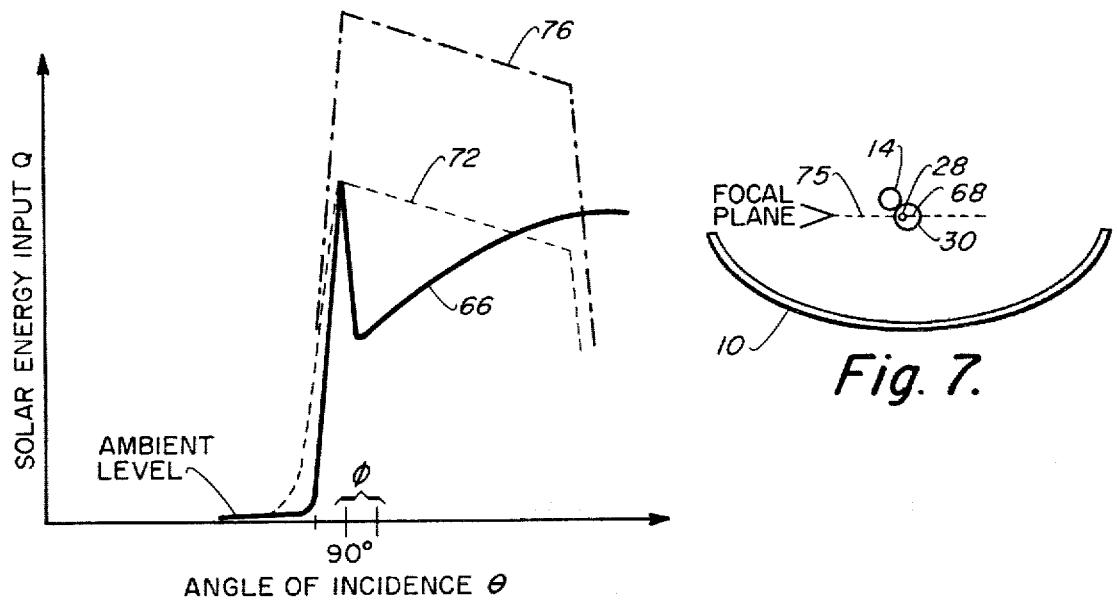
Fig. 4.
Fig. 7.
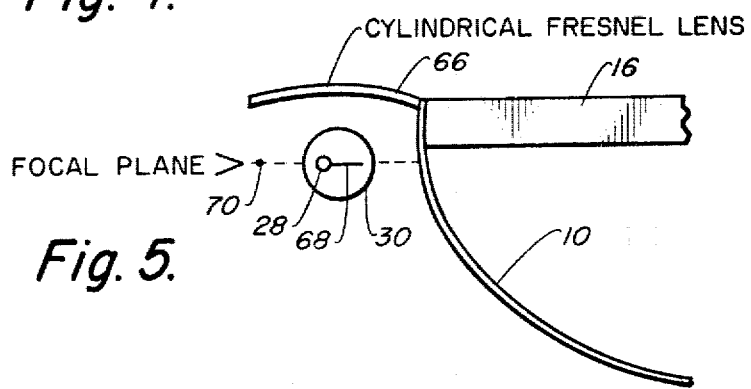
Fig. 5.
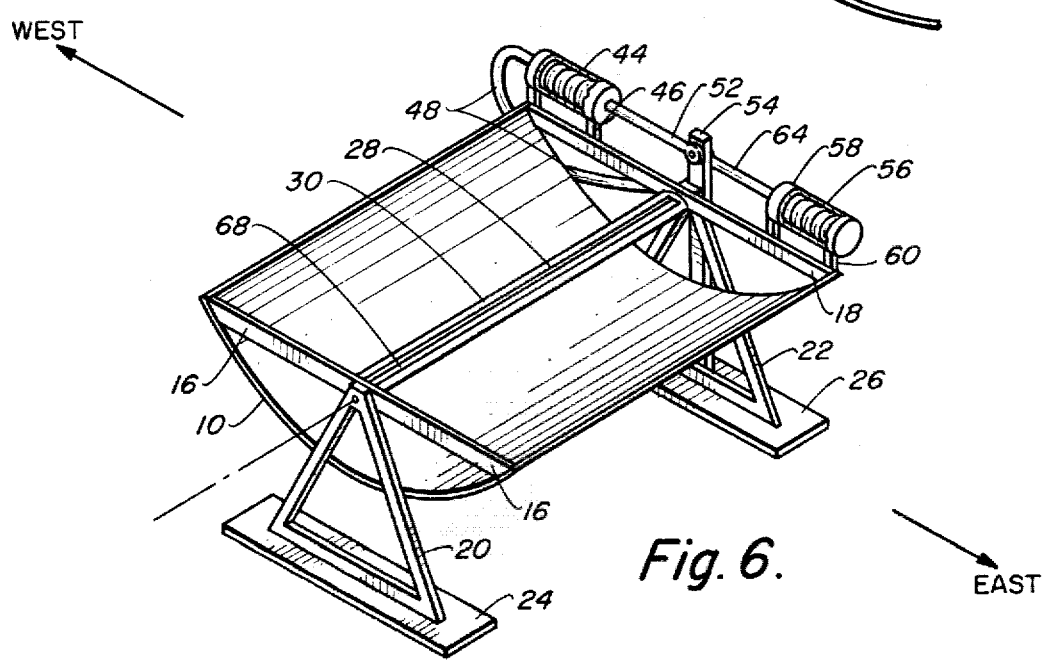
Fig. 6.

SOLAR-ENERGY-POWERED SUN TRACKER

STATEMENT OF GOVERNMENT INTEREST

The invention described herein may be manufactured and used by or for the Government of the United States of America for governmental purposes without the payment of any royalties thereon or therefor.

This is a division of application Ser. No. 069,665 filed Aug. 24, 1979, now U.S. Pat. No. 4,262,654.

BACKGROUND OF THE INVENTION

Solar tracking systems capable of accurately repositioning solar-energy collection devices are needed to maintain the collection devices at the proper orientation relative to the incident solar radiation. Sunlight reflectors called heliostats have long been used to maintain a beam of sunlight on a constant direction. The reflectors were rotated by clockwork or an auxiliary power supply such as an electric motor. Sunlight was used to trigger regulatory devices for the external power supply. Aside from additional energy use, electrically powered aiming systems require a power supply with a constant frequency and voltage and a separate feedback path to correct for error. Additionally, direct mechanical drives, such as worm gear actuators, are required to handle high wind loads found in an outdoor environment.

In many cases, it is desirable to use solar energy to rotate the reflector or other device (termed generally herein the collector) in the proper direction. Consequently, a number of devices have been developed which employ solar energy to direct and rotate the collector. For example, U.S. Pat. No. 4,027,651 by Robbins discloses a tracker having an arrangement of mirrors which reflect the sun's radiant energy to differentially head fluid-containing reservoirs to create a differential pressure which is used to rotate the tracker and the collector. Another tracker, disclosed by Farber et al in a "Self-Contained Solar Powered Tracking Device," ASME paper 76-WA/HT-'76, uses two sensor elements disposed on each end of a parabolic concentrator and fluidically connected to two power cylinders opposing each other through a rack and pinion gear arrangement. Unequal shading of the sensor elements causes a pressure differential which drives the power cylinders to rotate the concentrator to the desired orientation.

These devices, while effectual, are generally limited in accuracy, responsiveness, or in the type of environment in which they may be used.

SUMMARY OF THE INVENTION

The present invention provides a solar-powered sun tracking device which is inexpensive to construct and inexpensive to operate. It does not rely upon any externally powered devices or complex timing systems. The tracker is sensitive to small movement of the sun and has good morning response because little sunlight energy is required for early repositioning. It automatically repositions itself after cloudy periods and in its initial morning position.

These and other advantages and features are provided by the present invention in which a sensor containing a working fluid is heated by sunlight only when the sunlight approaches the tracker from a desired angle. The pressure produced by evaporating the fluid drives the system against a spring force provided by an expansion bellows to rotate the system to the desired position. A second bellows is used to compensate for environmental temperature effects. In one embodiment, a parallel plate filter permits only sunlight from the desired angle to strike the sensor directly. Sunlight is focused on the sensor from a reflector to reposition the tracker when the sun reappears after having been obscured by clouds. In two alternate embodiments, a cylindrical fresnel lens and a parabolic reflector, respectively, focus sunlight from the desired angle on the sensor. The fresnel lens and the parabolic reflector focus the sunlight on a thermally conductive fin attached to the sensor to reposition the tracker after cloudy periods.

BRIEF DESCRIPTION OF THE DRAWING

FIG. 4 is a plot of the solar energy input versus the angle of incidence between the sun's rays for the embodiments described herein;

FIG. 5 is a partial end view of an alternate embodiment in which a cylindrical fresnel lens is used to focus the sun's rays on the sensor tube;

FIG. 6 is a pictorial view of an embodiment in which the reflector trough is used to focus the sun's rays on the sensor tube; and FIG. 7 is a partial end view of the embodiment of FIG. 6.

DESCRIPTION OF THE PREFERRED EMBODIMENTS

Figure 1:
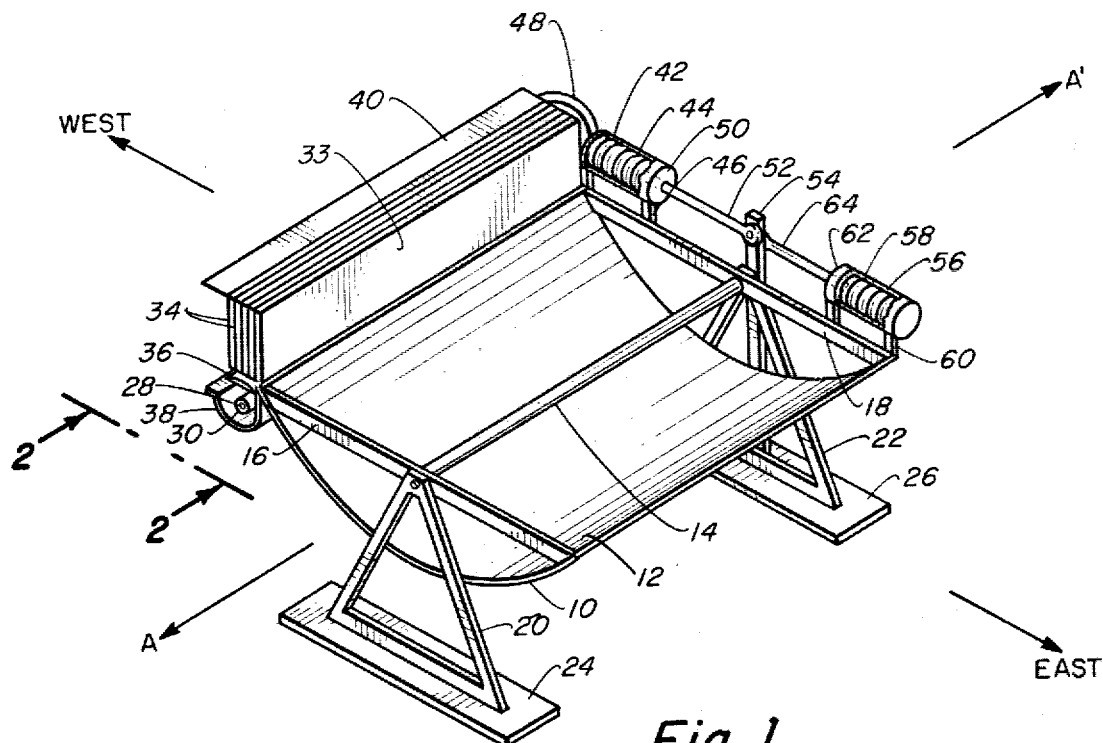
FIG. 1 is a pictorial view of an embodiment of the solar-powered tracking device.
Figure 2:
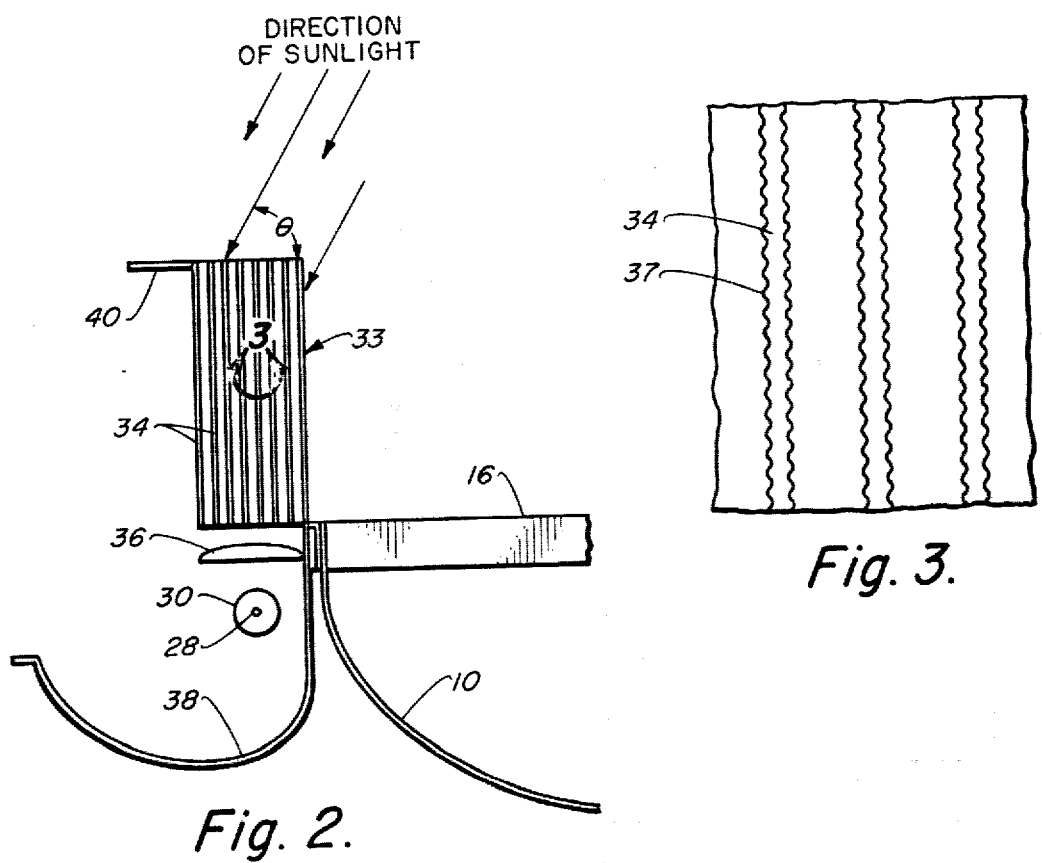
FIG. 2 is a partial end view of the solar powered tracker taken along line 2-2' in FIG. 1.
Figure 3:
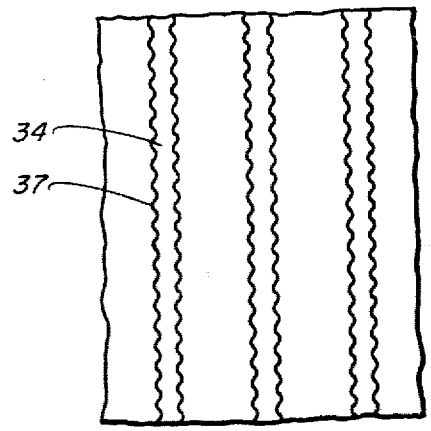
FIG. 3 is an enlarged end view of a portion of the solar filter plates indicated by circle 3-3' in FIG. 2 illustrating the antireflective ridges.

Referring now to the drawing wherein like reference characters designate like or corresponding parts in the several embodiments and, in particular, to FIGS. 1-3, there is shown an embodiment of a solar-energy-powered sun tracking device according to the present invention which may be used to position a solar-energy collector. The solar-energy collector may be of any conventional design which, typically, offers improved performance if continuously reoriented to receive the direct rays of the sun such as mirrors that reflect solar energy to a concentrator or simply flat plate collectors. The collector apparatus in the embodiment of FIGS. 1-3 includes a parabolic reflector trough 10 having a reflective surface 12 to focus reflected solar energy onto a solar-energy concentrator such as conventional concentrator tube 14. The parabolic reflector trough 10 is suspended from the ends of two rigid arms 16 and 18 which are rotatably coupled to the apex of A-shaped support members 20 and 22, respectively. The reflector trough 10 is thus free to rotate about an axis of revolution A-A' between the A-shaped support members 20 and 22 which are mounted on base members 24 and 26, respectively.

The solar-energy concentrator tube 14 is disposed between the two rigid arms 16 and 18 so that it lies on the line of focus of the reflector 10 which may be coincident with the axis of revolution A-A' (depending on the curvature of the reflector) as shown in FIG. 1. The reflected solar energy is collected by the concentrator tube 14 and transferred to a storage means or a user device by conventional techniques not shown. The embodiment shown in FIG. 1 is positioned to orient the axis of revolution A-A' nominally in the north-south direction so the reflector trough 10 may be rotated to track the sun as it moves from east to west.

The rotational position of the collector apparatus is controlled by the solar-energy-powered sun tracker of the present invention. A sensor bulb 28 which is filled with a working fluid such as Freon 11 is disposed parallel to the axis of revolution A-A' and is attached to the west end of the collector. The sensor bulb 28 is enclosed in a transparent convection heat insulator such as glass tube 30 which insulates the sensor bulb from convection loses while permitting radiant energy to reach the sensor bulb.

A solar filter 33 comprising several opaque parallel filter plates 34 is disposed above the sensor bulb 28 and rigidly attached to the west end of the arms 16 and 18. The height and spacing of the filter plates 34 are chosen so that direct sunlight is transmitted through the filter plates only for angles of incidence $\theta$ of $90°\pm\phi$ according to the desired tracking accuracy. The parallel plates allow high accuracy control over the solar-energy input to the sensor bulb as a function of the angle of incidence $\theta$ which in turn allows a large variation in the heat input to the sensor bulb 28 for small changes in the sun's angular position in the region of $\theta=90°\pm\phi$. Typically, the solar filter is designed so that no direct sunlight is transmitted for $\phi$ greater than $\pm\frac{1}{2}$ degree.

The filter plates 34 may include anti-reflective ridges 37 as shown in FIG. 3 to limit the transmission of solar energy which is not within the desired angle of incidence but may pass through the filter by reflecting one or more times between the plates.

A concentrating lens 36 is disposed between the solar filter plates 34 and the sensor bulb 28 to focus the rays which have passed through the filter onto the sensor bulb. A solar reflector 38 is disposed under the sensor bulb 28 to reflect solar radiation from angles of incidence greater than $90°+\phi$ to the sensor bulb. A reflector shade 40 is disposed from the outside parallel plate in order to limit the amount of solar radiation reflecting from reflector 38 and impinging on the sensor bulb 28 from below.

An expansion bellows 42 (hereinafter referred to as the drive bellows) has its supporting cylinder 44 rigidly mounted on the westward end of arm 18 by support members 46. The inside (open end) of the drive bellows 42 is fluidically coupled to the sensor bulb 28 by tube 48 (see FIG. 1) so that the pressure inside the bellows is a function of the vapor pressure of the working fluid within the sensor bulb. The closed end of the drive bellows 42 is coupled by rigid rod 52 to an eccentric drive stem 54 which is rigidly attached to A-shaped support member 22. The rigid rod 52 is rotatably connected to the drive stem 54 at a point 55 some distance from the axis of rotation A-A' of the parabolic reflector so that expansion or contraction of the drive bellows 42 as the vapor pressure in the sensor bulb/drive bellows system changes will produce torque about the axis A-A'.

A second expansion bellows 56 (referred to hereinafter as the environmental-compensator bellows) has its supporting cylinder 58 rigidly attached to the eastward end of arm 18 by support members 60. The normally open end (i.e., the end that normally receives pressure changes) of bellows 56 is sealed and a working fluid (same as used in bellows 42) is enclosed within the bellows' cavity. The other end (normally closed end) 62 of the bellows is coupled by rigid rod 64 to the eccentric drive stem 54 where the rigid rod 64 is connected so that it is free to rotate about the same axis as rigid rod 52. The environmental-compensator bellows 56 counteracts the torque applied to the drive stem 54 due to the expansion or contraction of the drive bellows caused by changes in ambient conditions (i.e., those conditions which affect the temperature of the working fluid in both the drive bellows and the environmental-compensator bellows such as the atmospheric temperature and heating of the bellows cylinders 44 and 58 by the sunlight) by supplying an equal torque in the opposite direction. The net torque on the drive stem 54 is therefore produced by the vapor pressure of the working fluid resulting from the heating of the sensor bulb by the direct or reflected sunlight.

The lengths of the rigid rods 52 and 64 which couple the movable ends of the drive bellows 42 and the environmental-compensator bellows 56, respectively, to the eccentric drive stem 54 are set so that when the sensor bulb and the two bellows are at the same temperature (for example, under shaded conditions or during the night), the solar-power tracker is rotated on its axis A-A' by the bellows' spring forces to assume its morning orientation (i.e., the reflector trough faces eastward to receive the morning sun). When these equal-temperature conditions are present, the vapor pressures acting on each bellows are equal so that the net torque applied to the point on the drive stem is a function of the bellows' spring forces.

FIG. 4 illustrates the relationship of the solar energy input available to drive the solar-drive bellows as a function of the angle of incidence $\theta$ of the solar rays for the embodiments described in the present disclosure. Considering the embodiment of FIGS. 1-3, solid curve 66 is a plot of the solar energy input to the sensor bulb 28 as a function of the angle of incidence $\theta$. For angles of incidence less than $90°-\phi$, the solar energy input Q to the sensor bulb 28 is determined by the atmospheric temperature since the solar filter plates 34 prevent the sun's rays from striking the sensor bulb directly and the shade similarly prevents reflections from reflector 38. As the angle of incidence $\theta$ reaches the angle $90°-\phi$, the direct rays pass through the filter and are concentrated by lens 36 on the sensor bulb 28. As shown by curve 66, the solar energy input Q to the sensor bulb 28 increases very rapidly to a high level in the region where the angle of incidence $\theta$ is $90°\pm\phi$. As the angle of incidence $\theta$ increases beyong $90°+\phi$, the energy input Q drops due to the shading by the parallel plates 34 but does not fall as sharply as nor to the same low level as it had been for the negative angles because a portion of the sun's energy strikes solar reflector 38 and is reflected to impinge on the sensor bulb 28. The gradual rise in Q as $\theta$ increases further is caused by the increasing amount of energy reflected from the solar reflector 38.

The temperature of the fluid in the sensor bulb 28 and thus the vapor pressure on the drive bellows 42 varies according to the solar energy input to the sensor bulb. For the fluid Freon 11, for example, the vapor pressure at 75° is 0.037 pounds per square inch (psi) above atmospheric pressure while at 120° F. the vapor pressure is 18.3 psi above atmospheric pressure.

The pressure of the working fluid above atmospheric pressure exerts a force on the drive bellows 42 tending to expand the bellows. This force is given by $F_P=A\cdot P_t$ where A is the area of the bellows to which pressure is applied and $P_t$ is the pressure of the working fluid above atmospheric pressure, with the subscript t indicating that the pressure is a function of the temperature of the fluid. The spring action of the drive bellows 42 exerts a counteracting force given by $F_S = K \cdot D$ where K is the spring constant of the bellows and D is the displacement. Since $F_S = F_P$, the displacement of the bellows is given by $$D = k \cdot P_t$$

where $k = (A/K)$.

The tracker/collector is designed so that during the length of time that it takes the sun to traverse the angle for which the parallel plate filter 34 passes sunlight sufficient solar energy is transmitted through the parallel plate filter 33 and focused by the concentrating lens 36 on the sensor bulb 28 to raise the temperature of the fluid to a value which produces a vapor pressure sufficient to rotate the tracker/collector to its maximum westward orientation.

In operation, the equal temperature conditions which are present during the night cause the tracker to rotate to its initial morning orientation and remain in that orientation until the sun's rays begin to pass through the parallel plate filter 33. At this time, the sensor bulb is heated due to the solar energy passing through the filter 33, thereby increasing the vapor pressure applied to the drive bellows 42 above that pressure due to the ambient conditions while the vapor pressure applied to the environmental-compensator bellows 56 is determined by the ambient conditions. This increased vapor pressure causes the drive bellows 42 to expand against its spring constant. The expansion in turn causes the tracker/collector to rotate on axis A–A' because of the increase in torque applied through the rigid rod 52 at point 55 on the eccentric drive stem 54.

The fluid in the sensor bulb will continue to increase in temperature, producing further rotation of the tracker/collector until the parallel plate filter 33 no longer passes the sunlight due to the change in the angle of incidence. Since the sun's rays no longer impinge on the sensor bulb 28, the temperature of the fluid in the bulb tends to decrease toward the atmospheric temperature and the vapor pressure on the drive bellows 42 decreases accordingly. This decrease in vapor pressure causes the tracker/collector to rotate in the eastward direction (toward the initial orientation about axis A–A') due to the bellows spring constant. However, as the fluid cools and the tracker/collector rotates back toward the east, the sun's rays will again pass through the parallel plate filter 33 because of the eastward rotation and the sun's movement, causing the temperature of the sensor bulb 28 to increase, the vapor pressure to increase, the drive bellows 42 to expand and the tracker/collector to rotate in the westward direction. This pattern of heating the sensor bulb 28 by solar energy passing through the parallel plate filter 33 to produce a westward rotation which removes the solar energy input to the sensor bulb until the sensor bulb is again heated by the solar energy due to the movement of the sun and/or the cooling of the sensor bulb, causes the tracker/collector to assume a position at the leading edge of the sun's direct rays as it tracks the sun's path. The average temperature of the working fluid in the sensor bulb will thus increase as the sun moves from east to west in order to maintain the appropriate tracker orientation by the appropriate displacement of the drive bellows 42.

If the sun is sufficiently obscured by clouds, the tracker/collector will fall behind the sun or equal temperature conditions may occur and the tracker/collector will return to the initial eastward orientation. However, when the sun reappears the rays will be directed on the sensor bulb from the solar reflector 38. This will raise the temperature and increase the vapor pressure of the sensor bulb 28, causing the tracker/collector to rotate in the westward direction. The tracker/collector will rotate until it reaches the normal operating position at the leading edge of the sun's direct rays whereupon the normal operational pattern is established.

Referring now to FIG. 5, there is illustrated an alternate means (replacing the parallel plate filter 33 and solar reflector 38 in FIG. 1) for controlling the solar energy input to the sensor bulb 28 as a function of the angle of incidence $\theta$ which offers improved performance in quickly repositioning the solar tracker when the tracker has fallen behind the angle of the sun because of the interruption of the direct sunlight by cloud cover. In this embodiment a cylindrical fresnel lens 66 is disposed above the sensor bulb 28 and oriented so that its focal plane passes through the sensor bulb and sunlight with an angle of incidence $\theta$ equals $90° \pm \phi$ focused on the bulb. A thermally conductive fin 68 which is attached to the sensor bulb 28 is disposed to lie in the focal plane of the fresnel lens 66. The sensor bulb 28 and the fin are enclosed in a convection heat insulating tube 30. The fresnel lens 66, the sensor bulb 28, and the fin 68, are arranged so that as the line of focus of the lens moves from the left (for example, from point 70) toward the sensor bulb 28 as the angle of incidence $\theta$ increases and is coincident with the sensor bulb at $\theta$ equals $90° \pm \phi$. For angles of incidence greater than this value, the fresnel lens 66 will focus the concentrated solar energy on the fin 68. Accordingly, when the position of the tracker lags behind the position of the sun due to cloud cover, the fin 68 conducts the solar energy concentrated by the lens to the sensor bulb 28 to reposition the solar tracker when the sun reappears.

Referring to FIG. 4, dashed curve 72 illustrates the solar energy input Q to the sensor bulb 28 as a function of the solar angle of incidence $\theta$ for the embodiment of FIG. 5. The solar energy input rises sharply from the ambient state as the angle of incidence $\theta$ reaches the angle at which the fresnel lens 66 line of focus strikes the sensor bulb 28. As the angle of incidence $\theta$ increases further and the concentrated energy is focused on the fin, the solar energy input gradually decreases due to various loss factors as the line of focus gets farther from the sensor bulb. The solar energy input Q falls extremely fast when the angle of incidence $\theta$ becomes large enough that the line of focus is beyond the end of the fin at point 74.

Referring now to FIGS. 6 and 7, there is shown an embodiment of the present invention in which a sensor bulb 28 and attached thermally conductive fin 66 is disposed in the focal plane (shown by dashed line 75 in FIG. 7) of a parabolic reflector trough 10. A solar energy concentrator tube 14 may be disposed adjacent the focal plane 75 (not shown in FIG. 6 for clarity) to collect solar energy for transfer to a storage means or a user device.

This embodiment provides increased solar energy input to the sensor bulb since the large reflector greatly increases the amount of collected energy as shown by curve 76 in FIG. 4. The solar energy input to the sensor bulb 28 is a function of the angle of incidence θ (in this case, θ equals 90° on the plot and is analogous to the angle at which the line of focus of the parabolic reflector is on the sensor bulb) is similar to that of the embodiment of FIG. 5 with an increased energy input for solar angles of incidence in which the line of focus is on the sensor bulb or the attached fin.

The embodiments of FIGS. 5, 6 and 7 operate to rotate the device in the same manner as the embodiment of FIG. 1. The temperature of the fluid in the sensor bulb 28 and thus the vapor pressure of the working fluid therein is at an ambient level until the angle of incidence θ reaches a value where the sunlight is focused on the sensor bulb by the fresnel lens 66 or the parabolic reflector 10 as shown in FIGS. 5 and 7, respectively. The resulting solar energy input to the sensor bulb 28 tends to rotate the tracker/collector by expanding the drive bellows 42. This in turn tends to lower the temperature of the fluid since the rotation changes the angle of incidence θ and thus lowers the energy input. This causes the tracker/collector to rotate back in the opposite direction which will tend to increase the solar energy input. In cases where the sensor bulb does not receive sufficient energy to track the sun because of shading, the energy striking the thermally conductive fin 68 when the shading is remove will reposition the tracker/collector at the normal operating position at the leading edge of the sun's direct rays (i.e., around θ equals 90°+φ).

Obviously many modifications and variations of the present invention are possible in the light of the above teachings. It is therefore to be understood that within the scope of the appended claims the invention may be practiced otherwise than as specifically described.

What is claimed is:

1. A solar-powered sun-tracking apparatus comprising:
   a. fluidic sensing means responsive to rays of radiant energy for producing a fluidic pressure;
   b. means for translating said fluidic pressure into a mechanical force;
   c. means for focusing rays of radiant energy on said fluidic sensing means when said rays have a predetermined range of angles of incidence relative to said focusing means; and
   d. means responsive to said mechanical force for positioning said sun-tracking apparatus so that said means for focusing is maintained at a predetermined position relative to the angle of incidence of said rays;
   e. said means for focusing rays of radiant energy including:
      a fresnel lens disposed between said rays and said fluidic sensing means; and
      a thermally-conductive fin coupled to said fluidic sensing means, said fresnel lens focusing the rays of radiant energy onto said fluidic sensing means when said rays have said predetermined range of angles of incidence and onto said thermally conductive fin for angles of incidence larger than said predetermined range.

2. The sun-tracking apparatus as recited in claim 1 wherein said fluidic sensing means includes a sensor bulb containing a heliotropic fluid.

3. The sun-tracking apparatus as recited in claim 1 or claim 2 wherein said means for translating said fluidic pressure into a mechanical force includes a first expansion bellows coupled to said fluidic sensing means so that the expansion and contraction of said first expansion bellows is related to said fluidic pressure.

4. The sun-tracking apparatus as recited in claim 1 wherein said means responsive to said mechanical force includes means for pivoting said means for focusing about an axis oriented in a north-south direction so that the said means for focusing is maintained at a predetermined position relative to the angle of incidence of said rays.

5. A solar-powered tracking apparatus comprising:
   a. fluidic sensing means responsive to rays of radiant energy for producing a fluidic pressure;
   b. means for focusing rays of radiant energy on said fluidic sensing means when said rays have a predetermined range of angles of incidence to said focusing means, and
   c. means for pivoting said means for focusing in response to said fluidic pressure;
   d. said means for focusing rays of radiant energy includes:
      a fresnel lens disposed between said rays and said fluidic sensing means; and
      a thermally-conductive fin coupled to said fluidic sensing means, said fresnel lens focusing the rays of radiant energy onto said fluidic sensing means when said rays have said predetermined range of angle of incidence and onto said thermally-conductive fin for angles of incidence larger than said predetermined range.

6. A sun-tracking device as recited in claim 5 wherein said means for pivoting includes:
   first expansion bellows means coupled to said fluidic sensing means so that the expansion and contraction of said first bellows is related to said fluidic pressure, said first bellows and said focusing means being fixed relative to structure means, said structure means being pivotally connected to a base support including an eccentric drive stem, the movable end of said first bellows being coupled to said eccentric drive stem so that expansion of said first bellows applies a force between said drive stem and said structure means tending to cause said structure means to pivot in a first direction.

7. The sun-tracking apparatus as recited in claim 6 further including a second bellow means fixed relative to said structure means having its movable end coupled to said drive stem so that the expansion of said bellows means applies a force between said drive stem and said structure means tending to cause the structure means to pivot in the direction opposite to the first direction.

8. The sun-tracking apparatus as recited in claim 5, 6 or 7 wherein said means for focusing rays of radiant energy includes:
   a reflector means oriented to focus rays received from said predetermined range of angles of incidence onto said sensor bulb;
   and further comprising a thermally-conductive fin coupled to said sensor bulb, said reflector means focusing rays received from angles of incidence larger than said predetermined range of angles onto said thermally-conductive fin.

* * * * *